United States Patent
Smolka (10) Patent No.: US 11,713,821 B2
(45) Date of Patent: Aug. 1, 2023

(54) FLUID CONTROL SPOOL

(71) Applicant: Danfoss Power Solutions a.s., Povazska, Slovakia, Povazska Bystrica (SL)

(72) Inventor: Stanislav Smolka, Povazska Bystrica (SL)

(73) Assignee: Danfoss Power Solutions a.s., Povazska, Slovakia, Povazska Bystrica (SK)

( * ) Notice: Subject to any disclaimer, the term of this patent is extended or adjusted under 35 U.S.C. 154(b) by 119 days.

(21) Appl. No.: 15/724,610

(22) Filed: Oct. 4, 2017

(65) Prior Publication Data
US 2018/0100593 A1 Apr. 12, 2018

(30) Foreign Application Priority Data
Oct. 11, 2016 (DE) ............... 10 2016 119 310.0

(51) Int. Cl.
| | |
|---|---|
| F16K 11/07 | (2006.01) |
| F04B 1/326 | (2020.01) |
| F04B 49/00 | (2006.01) |
| F15B 13/04 | (2006.01) |
| F16K 31/06 | (2006.01) |
| F15B 11/08 | (2006.01) |

(52) U.S. Cl.
CPC ............ *F16K 11/07* (2013.01); *F04B 1/326* (2013.01); *F04B 49/002* (2013.01); *F15B 13/0402* (2013.01); *F16K 31/0613* (2013.01); *F15B 11/08* (2013.01); *F15B 2211/20546* (2013.01); *F15B 2211/20553* (2013.01); *F16K 11/0708* (2013.01)

(58) Field of Classification Search
CPC .. F16K 11/07; F16K 31/0613; F16K 11/0716; F16K 11/0708; F16K 47/04; F16K 3/24; F15B 13/0402; F15B 11/08; F15B 2211/20546; Y10T 137/8671
USPC ....................................... 137/625.69
See application file for complete search history.

(56) References Cited

U.S. PATENT DOCUMENTS 2,747,612 A * 5/1956 Lee .................. F16K 11/0708
251/324
3,630,230 A 12/1971 Stahle
(Continued)

FOREIGN PATENT DOCUMENTS

| CN | 103775402 A | 5/2014 |
|---|---|---|
| CN | 104302910 A | 1/2015 |

(Continued)

*Primary Examiner* — Craig J Price
(74) *Attorney, Agent, or Firm* — McCormick, Paulding & Huber PLLC (57) ABSTRACT

The invention relates to a fluid control device (7, 30) that comprises a fluid transfer chamber (17) and a first fluid conduit (13), a second fluid conduit (11) and a third fluid conduit (14) which are fluidly connected to the fluid transfer chamber (17). A control spool (15) is arranged movably inside the fluid transfer chamber (17) in a way that the first fluid conduit (13) and the third fluid conduit (14) can be selectively fluidly connected to the second fluid conduit (11) through said fluid transfer chamber (17). The control surfaces (19, 20) of the control spool (15) are arranged in the vicinity of the first fluid conduit (13) the third fluid conduit (14).

20 Claims, 3 Drawing Sheets

(56) References Cited

U.S. PATENT DOCUMENTS

| | | | | |
|---|---|---|---|---|
| 3,807,454 | A * | 4/1974 | Westveer | F16K 11/0708 137/625.69 |
| 3,990,477 | A * | 11/1976 | Johnson | F16K 11/0708 137/625.69 |
| 4,368,872 | A * | 1/1983 | Machat | G05D 16/10 137/489 |
| 4,373,424 | A * | 2/1983 | Adachi | B60T 13/148 91/20 |
| 4,420,935 | A | 12/1983 | Kobald | |
| 4,456,434 | A * | 6/1984 | El Ibiary | F04B 1/324 137/625.65 |
| 5,588,805 | A * | 12/1996 | Geringer | F04B 11/00 417/222.1 |
| 6,615,868 | B2 * | 9/2003 | Ueki | F16K 11/0716 137/625.3 |
| 7,757,713 | B2 * | 7/2010 | Lohrberg | F16K 11/044 137/625.27 |
| 8,752,805 | B2 * | 6/2014 | Pilz | F16K 11/0708 251/14 |
| 9,399,985 | B2 * | 7/2016 | Sewcz | F04B 49/22 |
| 10,072,654 | B2 * | 9/2018 | Offenburger | F04B 53/109 |
| 10,309,390 | B2 * | 6/2019 | Zavadinka | F04B 49/08 |
| 10,443,755 | B2 * | 10/2019 | Hugel | F16K 11/0708 |
| 2004/0163721 | A1 * | 8/2004 | Cotton, III | F15B 13/044 137/625.65 |
| 2005/0118036 | A1 | 6/2005 | Belser | |
| 2005/0217740 | A1 * | 10/2005 | Segi | F16K 39/04 137/625.65 |
| 2013/0189127 | A1 | 7/2013 | Loewe et al. | |
| 2014/0130661 | A1 | 5/2014 | Howind et al. | |
| 2015/0050165 | A1 | 2/2015 | Zavadinka et al. | |
| 2015/0139824 | A1 | 5/2015 | Nagashima | |
| 2019/0249788 | A1 * | 8/2019 | Tanimura | F16K 11/0708 |

FOREIGN PATENT DOCUMENTS

| | | | |
|---|---|---|---|
| CN | 104421123 A | 3/2015 | |
| CN | 104948526 A | 9/2015 | |
| DE | 19748841 A1 | 5/1998 | |
| DE | 10 2013 216 395 A1 | 2/2015 | |
| DE | 102014109097 A1 | 12/2015 | |
| FR | 401937 A * | 9/1909 | F16K 11/0708 |

* cited by examiner

FLUID CONTROL SPOOL

CROSS-REFERENCE TO RELATED APPLICATION

This application claims foreign priority benefits under U.S.C. § 119 to German Patent Application No. 10 2016 119 310.0 filed on Oct. 11, 2016, the content of which is hereby incorporated by reference in its entirety.

TECHNICAL FIELD

The invention relates to a fluid control device that comprises a fluid transfer chamber, a first fluid conduit, a second fluid conduit and a third fluid conduit that are fluidly connected to said fluid transfer chamber, and that further comprises a control spool that is arranged movably inside said fluid transfer chamber in a way that said first fluid conduit and said third fluid conduit can be selectively fluidly connected to said second fluid conduit through said fluid transfer chamber. The invention further relates to a hydraulically adjustable fluid working machine, comprising a fluid control device and a controlling member for adjusting the performance of the hydraulically adjustable fluid working machine.

BACKGROUND

Hydraulic pumps that are variable with respect to the fluid volume that is pumped per revolution of the hydraulic pump (i.e. that are variable in fluid throughput) are well known in the state of the art. They are widely used if a hydraulic pump is driven with a constant speed (for example by a combustion engine), while the required fluid flow varies considerably. A similar situation exists, if the turning speed of the driving engine is (mainly) determined by a different requirement. This situation exists, for example, if the combustion engine of a car or of a truck is primarily used for propelling the car/truck through a mechanical connection to the wheels (classical gearbox), while the combustion engine is used additionally on an "auxiliary base" for pumping some fluid (a well-known example is a pump for pumping refrigerant of an air conditioning system of a car/truck).

If such a variable hydraulic pump is employed, the respective pump has to necessarily be influenced by a control signal. Quite often, the control signal is a hydraulic pressure. In this case, a servo piston is used that converts a controlling hydraulic pressure to a mechanical movement that in turn changes the fluid output behaviour of the variable hydraulic pump. Furthermore, a fluid control device (typically in form of a fluid control spool) has to be used as well to create an appropriate controlling hydraulic pressure for driving the servo piston in a way that at least one (typically two or even more) parameter(s) is (are) used for creating the controlling hydraulic pressure (driving pressure for the servo piston). Even more, the fluid control device has to be designed in a way that it is not too dependent (preferably essentially independent) with respect to other parameters that could influence the behaviour of the fluid control device. As an example, a fluid control device should not be prone to oscillations and/or should switch quickly (although some dampening effects to prevent oscillations might be preferred), despite of the mass of the spool of the fluid control device or the like.

An example of such a fluid control device is disclosed in German laid open document DE 10 2013 216 395 A1. Here, a fluid control device for variable hydraulic pumps that are employed in open hydraulic fluid circuits is described, where the fluid output behaviour of the variable hydraulic pump can be varied by means of a servo piston. The fluid control device has a control spool that shows two control surfaces. The control spool can be influenced by pressurized fluid that is pressurized by the variable hydraulic pump. The control spool can be moved along a longitudinal axis inside its housing. The various fluid connections of the fluid control device are connected to appropriate hydraulic fluid lines.

Although fluid control devices of the type in question work feasibly in practice, they still show deficiencies. Factors that still call for improvements are a reduced dependency on fluid flow forces that are caused by the (inevitable) flow demand by the servo piston for adjusting the variable hydraulic pump. Furthermore reduced response times of the unit and reduced adverse effects with respect to (inevitable) fluid leakage effects are desired as well.

Therefore, there is still room for improving fluid control devices of the type in question.

SUMMARY

The object of the invention is to suggest a fluid control device of the type currently under consideration that is improved over fluid control devices that are known in the state of the art. Similarly, the object of the invention is to provide a hydraulically adjustable fluid working machine that is improved over hydraulically adjustable fluid working machines that are known in the state of the art.

The presently proposed fluid control device and/or the presently proposed hydraulically adjustable fluid working machine solve(s) this object.

It is therefore proposed to design a fluid control device that comprises a fluid transfer chamber, a first fluid conduit, a second fluid conduit and a third fluid conduit that are fluidly connected to said fluid transfer chamber, and that further comprises a control spool that is arranged movably inside said fluid transfer chamber in a way that said first fluid conduit and said third fluid conduit can be selectively fluidly connected to said second fluid conduit through said fluid transfer chamber in a way that at least one control surface of said control spool is arranged in the vicinity of said first fluid conduit or said third fluid conduit. Usually, the first, second and third fluid conduits are arranged in this order (or possibly in the reverse order) along a "preferred direction" of the fluid control device, in particular along its housing and/or its control spool. Frequently, the "preferred direction" is at least essentially similar (if not at least essentially equal) to a longitudinal direction of the fluid control device (its housing and/or its control spool and/or another device), to the main fluid flow direction of the fluid, flowing through the fluid control device, to the (main) moving direction of the control spool, or the like. It should be mentioned that the numbering of the fluid conduits usually relates to the situation with respect to a fluid communication (that can presumably be established and/or disconnected, depending on the position of the control spool), i.e. usually with respect to the geometrical situation in the vicinity of the fluid transfer chamber. Therefore, it can well be that the situation "as seen from the outside" is different. For example, fluid channels can be foreseen within the housing in a way that the fluid ports that are visible on the outside of the housing show a different position (including a different ordering scheme) with respect to the situation as seen in the vicinity of the fluid transfer chamber. A (possibly connectable and/or disconnectable) fluid communication between a fluid conduit and the fluid transfer chamber can be established essentially around the full angular extent of the control spool. Likewise, it is possible that only a smaller angle is covered (as an example 7°, 15°, 30°, 45°, 60°, 75°, 90°, 105°, 120°, 135°, 150°, 165°, 180°, 195°, 210°, 225°, 240°, 255°, 270°, 285°, 300°, 315°, 330°, 345° and 360°), where the respective number can be used as an upper and/or lower limit of a corresponding angular interval. The "angular situation" can be the same for all three fluid conduits. However, it is also possible, that the angular extent varies for (any) two or all three of the first, second and third fluid conduit (or even more if more fluid conduits are present). Talking about "angular extent" it should be mentioned that the cross section of the control spool and/or of the fluid transfer chamber cannot only be of a circular shape. Instead, "rounded elongated forms" like an ellipse or the like can be used as well. Similarly, cross-sectional shapes with edges (for example a triangle, a rectangle, a square or generally regular/irregular n-edged polygons) can be envisaged. In case of a polygon (irrespective of the number of edges), one, some or even all of the corners can be somewhat rounded to avoid sharp edges. A particularly advantageous design of a fluid connection between a fluid conduit (several fluid conduits/all fluid conduits) and the fluid transfer chamber can be realised if the respective fluid conduit shows some kind of a ring-like structure that is formed as a cut-out volume inside the housing and/or shows some kind of a recess that is formed in the control spool in the respective region. When talking about a "control spool is arranged in the vicinity" of a certain fluid conduit, this can be understood in a way that the respective control surface lies closer to the respective fluid conduit as opposed to another fluid conduit, in particular to the "nearest other fluid conduit". Therefore, the limiting definition can comprise all arrangement ratios up to (but not including) 0.5 (i.e. 50%) of the distance between the nearest and the second nearest fluid conduit. However, typically smaller ratios are preferred, like 0.4, 0.3, 0.2, 0.1, 0.05, 0.02 or 0.01 (as an upper limit of an interval, typically starting with zero). Since the position of the control surface might be slightly varying with the movement of the control spool, the respective numbers can be valid with respect to essentially any "sensible position", in particular with one of the limiting positions ("leftmost position" and "rightmost position") and/or with respect to a "middle position", which can be the average of the two extreme positions.

While it is possible that at least a control surface of said control spool is arranged in the vicinity of said first fluid conduit or said third fluid conduit (not necessarily excluding control surfaces at other positions and/or in the vicinity of other fluid conduits), it is preferred if at least a control surface of said control spool is arranged in the vicinity of said first fluid conduit and said third fluid conduit, respectively. Additionally or alternatively, apart from the vicinity of said first fluid conduit and the vicinity of said third fluid conduit no control surfaces are foreseen that are connecting to said fluid transfer chamber. As this wording already implies, providing fluid conduits that connect to different parts of the fluid control device, in particular to different surfaces of the control spool that are not in fluid connection with a fluid transfer chamber (apart from leakage fluid flow; see previous statement) is not ruled out (or can be even advantageous). Using such an embodiment (single design feature or combination of two or more features), the overall control behaviour of the fluid control device can be improved, in particular with respect to "externally connected" devices, in particular with respect to a servo piston that is controlled by the fluid control device. Only as an additional remark, it is of course also possible that more fluid conduits are provided that are connecting to said fluid transfer chamber (apart from the said first, second and third fluid conduit). In particular in the case where a plurality of control surfaces is foreseen for the fluid control device/control spool/the housing, this sounds somewhat awkward, since an increased number of control surfaces has to be provided, where the control surfaces are even arranged at a somewhat elongated distance. Therefore, variations of length due to mechanical stress and/or temperature changes can have a stronger influence. Likewise, the machining of the fluid control device becomes more elaborate and hence more expensive. This statement is particular true with respect to the fluid control device as described in already mentioned German laid open document DE 10 2013 216 395 A1, where the control surfaces that are provided connect to the same fluid channel. Here, the effort of mechanical machining is smaller as compared to the presently suggested design. Furthermore, mechanical length changes due to mechanical stress and/or temperature changes can only have a minuscule effect (if at all). Nevertheless, the inventors have surprisingly found that by changing the placement of the control surface and/or increasing the number of respective control surfaces and/or placing the control surfaces at a greater distance from each other, the control behaviour of the fluid control device becomes significantly more independent from flow forces that are caused by the fluid flow demand to an external device (in particular of a servo piston that is used for varying the fluid pumping behaviour of a variable hydraulic pump, if connected to such a fluid control device device/such fluid control devices). This improvement in control characteristics can easily outweigh the increased effort with respect to machining efforts. It should be mentioned as well that it is of course possible that in addition to the three fluid conduits that were mentioned so far (i.e. first fluid conduit, second fluid conduit and third fluid conduit), additional fluid conduits can be provided. In particular, providing some additional fluid conduits will usually be even advantageous. As an example, if the fluid control device is (at least partially) controlled by at least one additional fluid connection (typically of varying pressure), providing an additional fluid conduit will be even somewhat of a "necessity". In this context it should be mentioned that the respective additional fluid conduit can be arranged in a way that there is no fluid connection of the respective fluid conduit and the fluid transfer chamber and/or that the respective additional fluid conduit will show a fluid connection to the fluid transfer chamber only in certain positions of the control spool. Only for completeness: if in the context of this application the wording "no fluid connection" is used, this wording does not necessarily rule out the possibility that a small (wanted or unwanted) fluid connection due to leakage will be present.

When designing the present fluid control device, it is possible that one, two, three, four, five, six, seven, eight or even more control surfaces are provided for a fluid conduit. The statement can be particularly true for the first fluid conduit, the second fluid conduit and/or possibly more fluid conduits that are present (connecting to the fluid transfer chamber or not). Also, the exact number of control surfaces might change from fluid conduit to fluid conduit. However, it is also possible that some, two of the fluid conduits, three of the fluid conduits, more of the fluid conduits or even all fluid conduits have the same number of control surfaces.

It is further suggested to design the fluid control device in a way that said control spool moves essentially parallel to the main fluid flow direction within said fluid transfer chamber and/or in a way that said at least one control surface is arranged essentially perpendicular to the main fluid flow direction within said fluid transfer chamber. This way, a fluid control device with a comparatively simple design and good fluid flow properties can be obtained. In particular, the fluid resistance for the flowing fluid can be reduced and/or a good switching behaviour can be achieved. Of course, it is possible that, in case a plurality of control surfaces is provided, only a single one, some, a plurality, the majority or (essentially) all control surfaces are arranged essentially perpendicular to the main fluid flow direction within said fluid transfer chamber. On the contrary, however, it is also possible that the main fluid flow and the movement of the control spool are in different directions and/or that the control surfaces are arranged in a different way.

It is further suggested to design the fluid control device in a way that at least one control surface is pressure compensated with respect to the fluid transfer chamber or with respect to the nearby fluid conduit, in particular with respect to said first fluid conduit or said third fluid conduit. This way, the control behaviour of the fluid control device will be particularly independent from the flow forces that are caused by the fluid flow demand of the servo piston. This way, an improved control behaviour and/or a faster control response can be obtained.

Another possible design can be obtained if at least one control surface is pressure dependent with respect to said fluid transfer chamber or said nearby fluid conduit, in particular with respect to said second fluid conduit. With such a design, the control performance can be made even more independent from the flow force that is caused by the fluid flow demand of the servo piston.

In particular, if a sensible combination of pressure compensated and pressure dependent control surfaces is used, the combined effect of both designs will be particularly profound.

It is further suggested to design the fluid control device in a way that said first fluid conduit and said third fluid conduit can be interchangeably connected to said second fluid conduit through said fluid transfer chamber, preferably comprising an intermediary position where no fluid flow is established between said first, second and third fluid conduit through said fluid transfer chamber. However, when particular requirements exist, it might be even advantageous if an intermediary position exists, where a fluid flow is established between all of the three fluid conduits (in particular said first, second and third fluid conduit). Additionally or alternatively, it can be advantageous if said first fluid conduit and said third fluid conduit can be connected to said second fluid conduit through said fluid transfer chamber in a mutually excluding way. Depending on the exact requirements of the application, by using a design according to the present suggestion, a particularly advantageous control performance can be realised, in particular a control performance that is particularly independent from the flow forces caused by the fluid flow demand of the servo piston.

Furthermore, it is suggested to design the fluid control device in a way that it comprises a fluid flow boosting device. The fluid flow boosting device can be designed (at least in part) as a fluid flux reducing means and/or as a dynamic pressure generating means that is arranged in the proximity of a control surface, preferably downstream of a control surface and/or inside said fluid transfer chamber, more preferably arranged in the proximity of a control surface lying in the vicinity of said first fluid conduit. Using such a fluid flow boosting device, the influence of flow forces that occur during a movement/transition of the control spool, in particular when a large fluid flow rate is demanded, can be (partially and/or essentially completely) counteracted, at least under certain fluid flow conditions. This way, a quick response of the fluid control device can be realised and/or improved. This effect can be realised by creating a fluid flow dependent force that acts on the control spool in the same direction as the hydrostatic force of the flowing fluid, in particular if a large fluid flow rate is present. By using one or more of the detailed embodiments that are mentioned, a particularly good compensation can be realised.

In particular it is possible to design the fluid control device in a way that it comprises at least one fluid flow establishing device, preferably an orifice device, enabling a preferably restricted fluid flow between at least two of said first, second and third fluid conduit, preferably between said second fluid conduit and said third fluid conduit. First experiments have shown that such a fluid flow establishing device can reduce the tendency towards occurrence of oscillations, in particular of the fluid control behaviour, very effectively. In particular, any (essentially unavoidable) restricted flow that occurs when using such a fluid flow establishing device, can usually be more than overcompensated by the improved behaviour of the fluid control device. In particular it is noted that the restricted flow through such a fluid flow establishing device can be very small, in particular as compared to the pumping behaviour of a fluid working machine that is controlled by the presently proposed fluid control device.

Furthermore, it is suggested that the fluid control device is designed in a way that it comprises at least one actuator device for controllably actuating said control spool, where the at least one actuator device is preferably taken from the group comprising fluidly actuated devices, electrically actuated devices and mechanically actuated devices. While it might be well sufficient to provide only a single actuator device for establishing a comparatively high qualitative control behaviour, the use of more than one actuator device (in particular two, three, four or even more actuator devices) might result in an even more improved fluid control behaviour of the fluid control device. Usually electrically actuated devices (like an electromagnet, an electric coil, a piezo element, a stepper motor, a servo motor or the like) are preferred. This is because the actuating signal (i.e. an electric output signal) can be easily generated and possibly amplified, even with a high preciseness. As an example, electronic components, including numerical computers (standard computers, electronic controllers, printed circuit board computers or the like) can be used for generating a suitable driving signal. Additionally, even the actuator itself can usually be of a simple and durable design.

Furthermore it is suggested to design the fluid control device in a way that at least one preloading device for preloading said control spool in a preferably adjustable way is present. This way, a certain "set-point" of the fluid control device can be easily established. Quite often, a certain set-point is required for certain applications. If a preloading device is provided, the fluid control device can be easily adapted for different applications. This might be done in some kind of a "once and forever" way at the factory, where a preloading device (for example a mechanical spring with a certain spring constant) is arranged within the fluid control device. Of course, by replacing the preloading device, a change of the set-point can be made even later on. However, if the preloading device is adjustable, a fine-tuning of the set-point can be realised at the factory and/or at a machine shop not only at the time of manufacture, but possibly even later on. In any case the respective fluid control device can be used for more arrangements, resulting in an essentially universally applicable fluid control device.

Furthermore it is suggested to design the fluid control device in a way that said fluid control device is designed as a fluid control device for a hydraulically adjustable fluid working machine that is preferably used in an open fluid flow hydraulic circuit, wherein preferably said first fluid conduit can be connected to a high-pressure part of said hydraulic circuit, said second fluid conduit can be connected to a controlling member for adjusting the performance of said hydraulically adjustable fluid working machine and said third fluid conduit can be connected to a low-pressure part of said hydraulic circuit, preferably to a low-pressure hydraulic fluid reservoir. When employing the presently suggested fluid control device in such a way, it can show its intrinsic advantages and control characteristics in a particularly profound way. However, it should be mentioned that the presently suggested fluid control device can also be used for closed fluid flow hydraulic circuits and/or for hydraulic circuits with an open fluid flow part and a closed fluid flow part and/or for hydraulic circuits that run partially (in particular with respect to time) in an open fluid flow mode and partially in a closed fluid flow mode.

Furthermore, a hydraulically adjustable fluid working machine is suggested that comprises a controlling member for adjusting the performance of said hydraulically adjustable fluid working machine, preferably a servo piston, and a fluid control device according to the previous description and suggestions for actuating said controlling member.

BRIEF DESCRIPTION OF THE DRAWINGS

Further advantages, features, and objects of the invention will be apparent from the following detailed description of the invention in conjunction with the associated drawings, wherein the drawings show.

DETAILED DESCRIPTION

Figure 1:
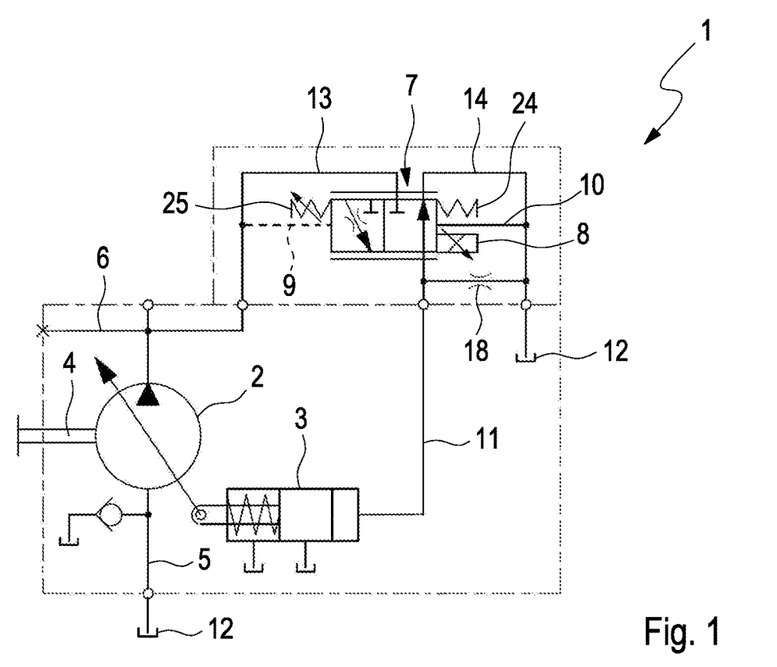
FIG. 1: a variable hydraulic pump with a fluid control circuit, comprising a fluid control valve according to a first embodiment.

In FIG. 1, a first possible design of a control circuit 1 for a variable hydraulic pump 2 is shown. The fluid pumping behaviour of the variable hydraulic pump 2 can be varied by means of a servo piston 3. The position of the servo piston 3 determines the fluid volume that is pumped per revolution of the variable hydraulic pump 2 (fluid flux). The variable hydraulic pump 2 is driven by a combustion engine (not shown) via a rotating shaft 4. Thanks to the controllability of the variable hydraulic pump 2, a varying fluid flux can be realised, even if the combustion engine (driving engine) is operated at a certain constant rotating speed. The control circuit 1 can be equally employed if the rotating speed of the driving engine is primarily determined by another function, which is the case for a car or a truck with the standard gearbox transmission. Here, the rotating speed of the driving engine is primarily determined by the speed of the car/vehicle. Nevertheless, thanks to the variability of the variable hydraulic pump 2, the fluid pumping behaviour of the variable hydraulic pump 2 can be independent from the rotating speed of the driving engine (within certain limits).

Presently, the hydraulic circuit (including the control circuit 1) is of an open fluid flow type. I.e., hydraulic oil is sucked in through a suction line 5 from a fluid reservoir 12 at ambient pressure (for example an open tank). The hydraulic fluid is pressurized by means of the variable hydraulic pump 2 and output to the system pressure line 6. Depending on the pumping behaviour of the variable hydraulic pump 2 (pumped fluid flux) and the amount of hydraulic fluid that is consumed by the various hydraulic consumers (not shown), an equilibrium state will be reached, defining the pressure in the system pressure line 6. Usually, for "fine-tuning" the pressure in the system pressure line 6, a (presently not shown) variable valve and/or a pressure relief valve is used that sets the pressure in the system pressure line 6 to a precise pressure level (variable valve) or that limits the maximum achievable pressure to an upper limit (pressure relief valve). Both the pressure relief valve as well as the variable valve short-circuit the pressurized hydraulic fluid in the system pressure line 6 to the fluid reservoir 12 at ambient pressure. It should be noted that thanks to the variability of the variable hydraulic pump 2 the amount of pressurized fluid that has to be short-circuited to the fluid reservoir 12 is usually comparatively low.

An example of variable hydraulic pumps 2 whose fluid pumping behaviour can be varied in dependence of the position of a servo piston 3 are so-called wobble plate pumps. Here, the angular displacement of a wobble plate determines the length of the stroke traveled by the respective pistons of the wobble plate pump.

In the presently shown embodiment of a control circuit 1, an increased pressure in the control pressure line 11 will push the servo piston 3 towards the left (against the force of a return spring), resulting in a higher angular tilt of the wobble plate that results in an increased length of the individual strokes of the pistons; finally resulting in an increased fluid throughput of the variable hydraulic pump 2.

The position of the servo piston 3 is controlled by a fluid control valve 7 according to a first embodiment. The fluid control valve 7 of the first embodiment is of a so-called "pressure increasing functionality" ("PIF"), which means that an increased electric input signal that is introduced into an electric coil of an electromagnetic actuator 8 will usually result in a higher pressure in the servo piston 3, which will finally result in an elevated pressure in the system pressure line 6 as well (by virtue of an increased pumping rate of the variable hydraulic pump 2). The electromagnetic actuator 8 is designed as some kind of a "push-type actuator" (a notation that becomes clear when looking at FIG. 2), since it is pushing the control spool 15 into the housing 16 (seen at the interface between electromagnetic actuator 8 and control spool 15), when an electric current is applied (or increased). Nevertheless, for completeness it should be mentioned that a different control behaviour of the fluid control valve 7 might occur in certain situations, since the pressure in the system pressure line 6 varies with a multitude of parameters.

Furthermore, in the schematics of the control circuit 1 in FIG. 1 it can be seen that the position of the fluid control valve 7 (more precise: the position of the control spool 15 of the fluid control valve 7) is additionally influenced by two mechanical preloading springs 24, 25 (one of them is adjustable, namely adjustable preloading springs 25). The hollow chambers, in which the two mechanical preloading springs 24, 25 are located, are filled with fluid, where the fluid is (essentially) at ambient pressure by virtue of fluid pressure input line 10 that in turn is connected to ambient pressure line 14. In the detailed embodiment (see FIG. 2), one of the hollow chambers (the right one; where preloading spring 24 is located) is directly connected to a fluid pressure input line 10, while the other hollow chamber (the left one; where preloading spring 25 is located) is fluidly connected to the already mentioned "opposite" hollow chamber through a fluid communication channel 31 that is arranged inside control spool 15. In FIG. 1, a fluid pressure dependency effect 9 is shown, which is represented by a dashed line in the schematics of FIG. 1 (on the left side of fluid control valve 7). It is to be noted that this is not a "real fluid line", but only an effective behaviour. Namely, an increasing pressure level in system pressure line 13 will push the fluid control valve 7 towards a position, in which an (increased) fluid flow will be established from the system pressure line 6 (via system pressure input line 13, fluid transfer chamber 17 and control pressure line 11) to the servo piston 3. In the schematics of FIG. 1 this corresponds to a movement of the control spool towards the "right side".

A pressure in the fluid pressure input line 10, however, does not affect the position of the control spool 15, since (essentially) the same fluid pressure level is present in both hollow chambers at the ends of control spool 15 and the pressure exposed surfaces 21, 23 are pressure balanced.

Figure 2:
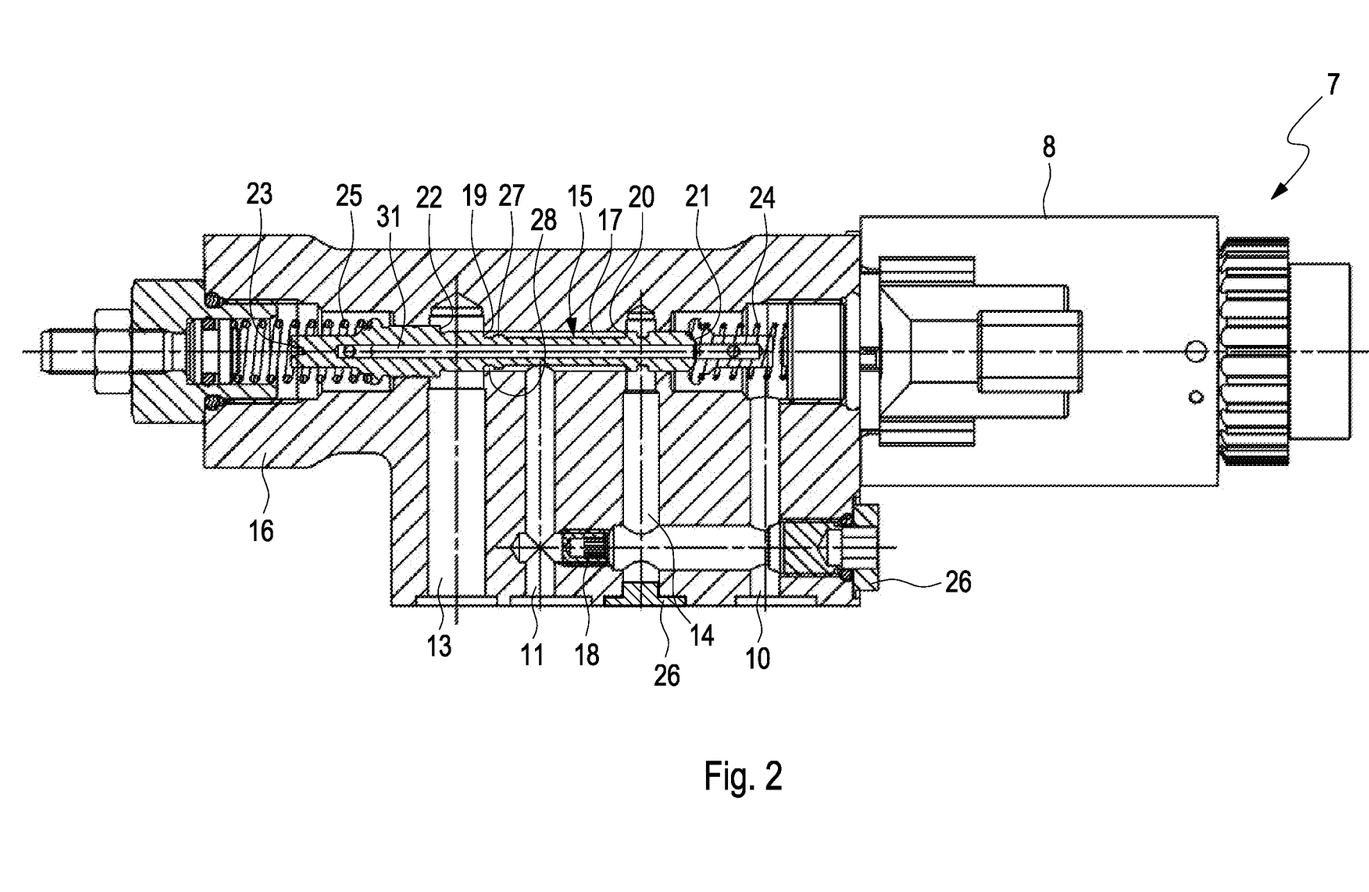
FIG. 2: a first embodiment of a fluid control valve according to a first embodiment in a schematic cross section.

The "logic behaviour" of the movement of control spool 15 with respect to an increased system pressure (fluid pressure dependency effect 9) can be understood when looking at FIG. 2. This is because the control spool 15 is not completely pressure balanced with respect to the pressure in system pressure input line 13, but instead an effect will occur due to pressure exposed surface ring 22. An increase in pressure in system pressure line 13 will thus cause a movement of control spool 15 towards "the left side" in FIG. 2, i.e. a fluid connection between system pressure input line 13 and control pressure line 11 will be established (increased). This corresponds to a movement of the control spool 15 "to the right" in the fluid schematics of FIG. 1.

More details of the fluid control valve 7 can be seen in FIG. 2. Here, a schematic cross section through the fluid control valve 7 is shown.

A control spool 15 is movably arranged in a housing 16. Due to the design of the fluid control valve 7, the movement of the control spool 15 is limited to a movement in a longitudinal direction (in FIG. 2 from left to right and from right to left).

Due to the design of the housing 16 and the control spool 15 with a varying outer diameter (for the control spool 15) and inner diameter (for the housing 16), a fluid transfer chamber 17 is realised in a certain section of the fluid control valve 7. The fluid transfer chamber 17 comprises a hollow volume of an essentially cylinder-barrel-like shape (with a certain, finite thickness).

In the present design, the fluid transfer chamber 17 is always fluidly connected to the control pressure line 11 that connects the fluid control valve 7 and the servo piston 3. "Always" means all positions that can be reached realistically during a normal use of the fluid control valve 7.

The fluid connection between the system pressure input line 13 (which is connected to the system pressure line 6 in the embodiment of a control circuit 1 according to FIG. 1) and the ambient pressure line 14 (that is connected to the fluid reservoir 12 in the control circuit 1) are only selectively connected to the fluid transfer chamber 17, respectively. Whether a fluid communication is established or not depends on the (longitudinal) position of the control spool 15. If the control spool 15 is moved to the left (in particular as compared to the intermediary position shown in FIG. 2), where neither a fluid connection between system pressure input line 13 and fluid transfer chamber 17, nor between ambient pressure line 14 and fluid transfer chamber 17 is established, a fluid communication will be established at a certain point between system pressure input line 13 and fluid transfer chamber 17 (and therefore control pressure line 11, which is always connected to the fluid transfer chamber 17). This is, because the system pressure control surface 19 will form a gap of a finite thickness (increasing with a leftward movement of the control spool 15), enabling a fluid flux through the thus formed gap.

Likewise, when a movement of the control spool 15 to the right side of the intermediary position of FIG. 2 occurs, the ambient pressure control surface 20 will form a circular gap, thus enabling a fluid communication between control pressure line 11 and ambient pressure line 14 through fluid transfer chamber 17.

As it is clear from the drawing of FIG. 2, the control spool 15 is pressure compensated with respect to the pressure in the control pressure line 11. Furthermore, due to the design and arrangement of the various surfaces, the position of the control spool 15 is not dependent on the pressure in the ambient pressure line 14 either; i.e. the control spool 15 is pressure compensated with respect to the fluid pressure in ambient pressure line 14, as well. However, the latter statement is not necessarily perfectly true, in particular if rapid pressure changes occur in ambient pressure line 14 and/or a fast movement of the control spool 15 occurs. As it is clear from FIG. 2 the hollow chambers in which the "outer" pressure exposed surfaces 21 and 23 are located are in fluid communication with each other via fluid communication channel 31, and only one of the hollow chambers (in FIG. 2 the right one) is in "direct fluid communication" with fluid pressure input line 10. Therefore, due to the limited orifices, in particular of fluid communication channel 31, some residual effects might occur.

The position of the control spool 15 is dependent on the pressure in the system pressure input line 13 via pressure exposed surface 22, which is indicated in the fluid schematics of FIG. 1 as a fluid pressure dependency effect 9 (dashed line), and which was already previously described.

A further influence on the position of the control spool 15 of fluid control valve 7 comes from the electromagnetic actuator 8 that is arranged on the right side of the fluid control valve 7. The electromagnetic actuator 8 comprises an electric coil. When energised, the electromagnetic coil creates a magnetic field that pushes (in the present embodiment) the control spool 15 to the left side (i.e. an electromagnetic actuator 8 of a "push-type" is used). This way, a fluid control valve 7 with a so-called "pressure increasing functionality" (PIF) is realised.

The electric current (i.e. the electric control signal) that is applied to the electromagnetic actuator 8 can be generated by an electronic controller (which itself can use one or more input signals). In particular, a programmable digital controller (single circuit board controller, for example) can be used for generating a suitable electric control signal with comparatively little effort. In the presently shown embodiment, the "major determining" influence on the position of the control spool 15 in the fluid control valve 7 comes from the electromagnetic actuator 8. By "major determining" effect it is meant that in most cases the final decisive influence that determines the position of the fluid control valve 7 and hence of the servo piston 3 and finally the pumping behaviour of the variable hydraulic pump 2 comes from this electric control signal. Furthermore, this will usually be the signal showing the largest variations when in use and/or the signal which is changed more often as compared to the other input signals, when the control circuit 1 is in use.

Other influences on the position of the control spool 15 come from the preloading springs 24, 25, which are designed as helical springs with a certain spring constant. With the aid of a thread, one of the two preloading springs, namely the preloading spring 25 on the left side in FIG. 2 is adjustable (adjustable preloading spring 25). All forces that act on the control spool 15 will have an influence in the balancing of the forces acting on the control spool 15 and thus on the position of the control spool 15. By the position of the control spool 15, however, the effective switching circuitry of the control circuit 1 is determined.

For completeness it should be mentioned that in the presently shown embodiment of a fluid control valve 7 according to FIG. 2, the ambient pressure line 14 and the fluid pressure input line 10 are fluidly connected to each other even inside the housing 16 of the fluid control valve 7. Therefore, they form a common fluid connection port in the housing 16 of the fluid control valve 7. Some bores that are present in the housing 16 due to manufacturing necessities are closed by plugs 26.

Another detail of the fluid control valve 7 is the throttling orifice 18 (also visible in the schematics according to FIG. 1) that creates a fluid connection between the control pressure line 11 and the ambient pressure line 14, irrespective of the position of the control spool 15. The fluid flux through the throttling orifice 18, however, is very limited since only a very small bore is provided in the throttling orifice 18. A big advantage of the throttling orifice 18 is that by this throttling orifice 18 oscillations that could otherwise occur in the fluid control valve 7 can be heavily suppressed. Therefore, under normal circumstances no such disadvantageous oscillations will occur at a significant level.

The big advantage of the design of the control spool 15 with its control surfaces 19 and 20 is that the control surfaces 19 and 20, where the locally highest fluid velocities will occur, are separated from the hydrostatic forces acting on them. This has the effect that the control performance of the fluid control valve 7 is significantly more independent from the fluid flow needs by the servo piston 3 (i.e. the fluid flow rate through the control pressure line 11). This way a significantly improved controlling behaviour of the fluid control valve 7 can be realised.

Another detail that results in a surprisingly huge improvement of the performance of the fluid control valve 7 is the fluid flux reducing web 27 that is arranged on the control spool 15 on the leeward side (downstream side) of the system pressure control surface 19. (Due to the pressures occurring at system pressure input line 13 and control pressure line 11, a flux will only occur in the direction from the system pressure input line 13 towards the control pressure line 11, if at all.) By virtue of the fluid flux reducing web 27, an increased pressure will be present in the intermediary volume 28 between system pressure control surface 19 and fluid flux reducing web 27. This pressure within the intermediary volume 28 will have an influence on the force balance of the forces acting on the control spool 15, and thus on the position of the control spool 15 as well. First experiments have shown that this fluid flux reducing web 27 compensates flow forces acting on the control spool 15 during a movement of the control spool in case a large fluid flow rate is present. This way, the response time of the fluid control valve 7 can be reduced, so that the fluid flux reducing web 27 acts as a boosting means with respect to the switching time of the fluid control valve 7.

Figure 3:
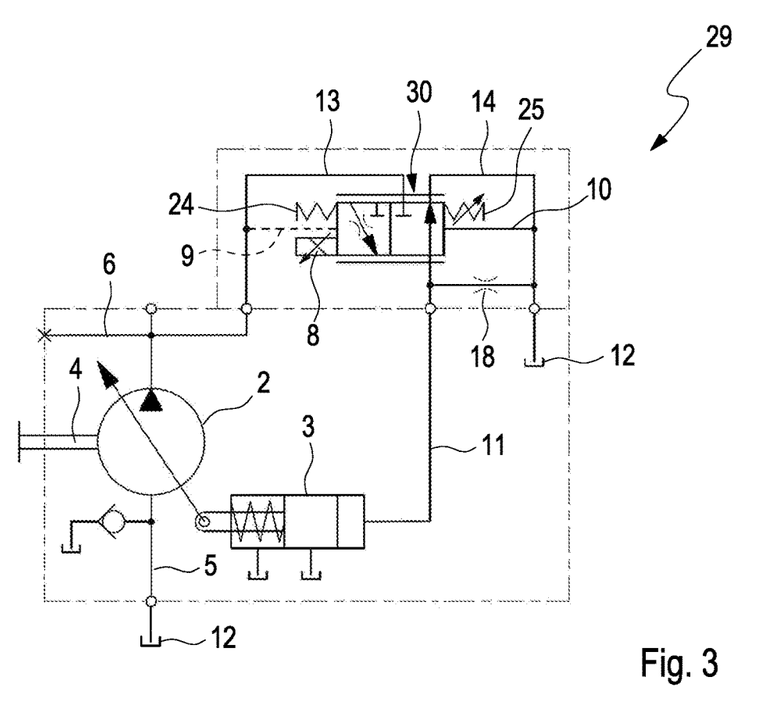
FIG. 3: a variable hydraulic pump that is controlled by a fluid control circuit, comprising a fluid control valve according to a second embodiment.

In FIG. 3, a second embodiment of a control circuit 29 is shown. Similar to the control circuit 1, the presently shown control circuit 29 also controls the pumping rate of a variable hydraulic pump 2, serving an open fluid circuit, by means of a servo piston 3. Due to the different design of the fluid control valve 30 employed (as compared to the embodiment of a fluid control valve 7, as shown in FIGS. 1 and 2), the various forces that act on the control spool 15 (and therefore the various devices, in particular the preloading springs 24, 25 and the electromagnetic actuator 8) are re-arranged. By this, the fluid control valve 30 and the control circuit 29 will act with a "pressure decreasing functionality" (PDF), i.e. with a functionality that an increased electric current that is applied to the electric coil of the electromagnetic actuator 8 will result in a decreased fluid pumping rate of the variable hydraulic pump 2.

Figure 4:
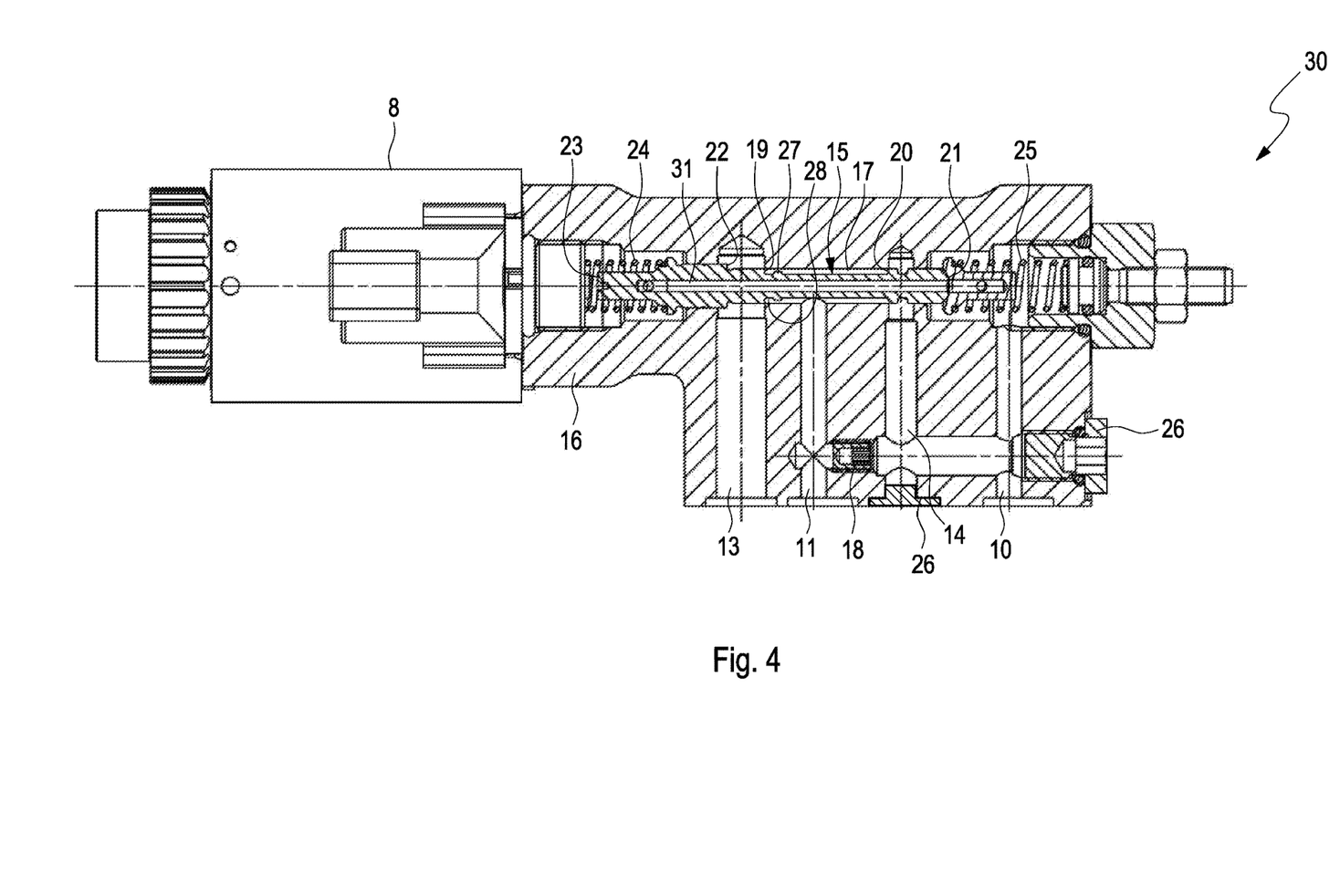
FIG. 4: a fluid control valve according to a second embodiment in a schematic cross-sectional view.

Details of the fluid control valve 30 that is employed for the control circuit 29 can be seen in FIG. 4, showing a schematic cross-sectional view of the fluid control valve 30.

Apart from the different arrangement of the various forces acting on the control spool 15, the design is quite similar to the design of the fluid control valve 7, shown in FIG. 2. In particular, the position of the fixed preloading spring 24, of the variable preloading spring 25, and particularly of the electromagnetic actuator 8 are changed.

Apart from these differences (that will result in a different overall behaviour, of course), the design ideas and design realisations of the fluid control valve 30 are very similar to the fluid control valve 7. For brevity, an elaborate discussion is not repeated and the person skilled of the art is simply directed to an appropriate adaption of the afore discussed design features and functionalities.

While the present disclosure has been illustrated and described with respect to a particular embodiment thereof, it should be appreciated by those of ordinary skill in the art that various modifications to this disclosure may be made without departing from the spirit and scope of the present disclosure.

REFERENCE LIST

1. Control circuit
2. Variable hydraulic pump
3. Servo piston
4. Rotating shaft
5. Suction line
6. System pressure line
7. Fluid control valve
8. Electromagnetic actuator
9. Fluid pressure dependency effect (dashed line)
10. Fluid pressure input line (right line)
11. Control pressure line
12. Fluid reservoir
13. System pressure input line
14. Ambient pressure line
15. Control spool
16. Housing
17. Fluid transfer chamber
18. Throttling orifice
19. System pressure control surface
20. Ambient pressure control surface
21. Pressure exposed surface of 10
22. Pressure exposed surface of 13
23. Pressure exposed surface of 9
24. Preloading spring (fixed)

25. Adjustable preloading spring
26. Plug
27. Fluid flux reducing web
28. Intermediary volume
29. Control circuit
30. Fluid control valve
31. Fluid communication channel

What is claimed is:

1. A fluid control device, comprising a fluid transfer chamber, a first fluid conduit, a second fluid conduit and a third fluid conduit that are fluidly connected to said fluid transfer chamber, a control spool that is arranged movably inside said fluid transfer chamber in a way that said first fluid conduit and said third fluid conduit can be selectively fluidly connected to said second fluid conduit through said fluid transfer chamber, wherein a first control surface of said control spool is arranged in a vicinity of said first fluid conduit such that said first control surface is closer to said first fluid conduit as opposed to another fluid conduit of the second fluid conduit, and the third fluid conduit, wherein a second control surface of said control spool is arranged in a vicinity of said third fluid conduit such that said second control surface is closer to said third fluid conduit as opposed to another fluid conduit of the first fluid conduit, and the second fluid conduit, wherein said control spool comprises an intermediary position where no fluid flow is established between said first, second and third fluid conduit through said fluid transfer chamber, wherein a fluid flow boosting device, in a form of a fluid flux reducing means and/or a dynamic pressure generating means, is arranged in the proximity of said first control surface, is arranged downstream of said first control surface towards said second fluid conduit and inside said fluid transfer chamber, wherein the fluid flow boosting device is configured to increase pressure in an intermediary volume between the fluid flow boosting device and said first control surface during operation of the fluid control device, wherein said first control surface fluidly connects and disconnects said first fluid conduit to and from said fluid transfer chamber and said second control surface fluidly connects and disconnects said third fluid conduit to and from said fluid transfer chamber, and wherein said second fluid conduit is always fluidly connected to said fluid transfer chamber.

2. The fluid control device according to claim 1, wherein the first control surface of said control spool is arranged in the vicinity of said first fluid conduit and the second control surface is arranged in the vicinity of said third fluid conduit respectively and/or wherein apart from the vicinity of said first fluid conduit and the vicinity of said third fluid conduit no control surfaces are foreseen that are connecting to said fluid transfer chamber.

3. The fluid control device according to claim 2, wherein said control spool moves essentially parallel to the main fluid flow direction within said fluid transfer chamber and/or wherein in that said first control surface is arranged essentially perpendicular to the main fluid flow direction within said fluid transfer chamber.

4. The fluid control device according to claim 1, wherein said control spool moves essentially parallel to the main fluid flow direction within said fluid transfer chamber and/or wherein said first control surface is arranged essentially perpendicular to the main fluid flow direction within said fluid transfer chamber.

5. The fluid control device according to claim 1, wherein the first control surface is pressure compensated with respect to the fluid transfer chamber or with respect to said first fluid conduit.

6. The fluid control device according to claim 1, wherein said first control surface is pressure dependent with respect to said fluid transfer chamber or said second fluid conduit.

7. The fluid control device according to claim 1, wherein said first fluid conduit and said third fluid conduit are configured to be interchangeably connected to said second fluid conduit through said fluid transfer chamber and/or wherein said first fluid conduit and said third fluid conduit can be connected to said second fluid conduit through said fluid transfer chamber in a mutually excluding way.

8. The fluid control device according to claim 1, wherein at least one fluid flow establishing device enabling a restricted fluid flow between at least two of said first, second and third fluid conduit.

9. The fluid control device according to claim 8, wherein the at least one fluid flow establishing device is an orifice device.

10. The fluid control device according to claim 8, wherein the at least one fluid flow establishing device enables a restricted fluid flow between said second fluid conduit and said third fluid conduit.

11. The fluid control device according to claim 1, further comprising at least one actuator device for controllably actuating said control spool.

12. The fluid control device according to claim 11, wherein the at least one actuator device is taken from the group comprising fluidly actuated devices, electrically actuated devices, and mechanically actuated devices.

13. The fluid control device according to claim 1, further comprising at least one preloading device for preloading said control spool.

14. The fluid control device according to claim 13, wherein the at least one preloading device is configured for preloading said control spool in an adjustable way.

15. The fluid control device according to claim 1, wherein said fluid control device is a fluid control device for a hydraulically adjustable fluid working machine that is used in an open fluid flow hydraulic circuit, wherein said first fluid conduit can be connected to a high-pressure part of said hydraulic circuit, said second fluid conduit can be connected to a controlling member for adjusting the performance of said hydraulically adjustable fluid working machine and said third fluid conduit can be connected to a low-pressure part of said hydraulic circuit.

16. The fluid control device according to claim 15, wherein said low-pressure part of said hydraulic circuit is a low-pressure hydraulic fluid reservoir.

17. A hydraulically adjustable fluid working machine, comprising a controlling member for adjusting the performance of said hydraulically adjustable fluid working machine, and the fluid control device according to claim 1 for actuating said controlling member.

18. The fluid control device according to claim 17, wherein said controlling member is a servo piston.

19. A fluid control device, comprising a fluid transfer chamber, a first fluid conduit, a second fluid conduit and a third fluid conduit that are fluidly connected to said fluid transfer chamber, a control spool that is arranged movably inside said fluid transfer chamber in a way that said first fluid conduit and said third fluid conduit can be selectively fluidly connected to said second fluid conduit through said fluid transfer chamber, wherein a first control surface of said control spool is arranged in a vicinity of said first fluid conduit such that said first control surface is closer to said first fluid conduit as opposed to another fluid conduit of the second fluid conduit, and the third fluid conduit, wherein a second control surface of said control spool is arranged in a vicinity of said third fluid conduit such that said second control surface is closer to said third fluid conduit as opposed to another fluid conduit of the first fluid conduit, and the second fluid conduit, wherein a fluid flow boosting device, in a form of a fluid flux reducing means and/or a dynamic pressure generating means, is arranged downstream of said first control surface towards said second fluid conduit and inside said fluid transfer chamber, wherein the fluid flow boosting device is configured to increase pressure in an intermediary volume between the fluid flow boosting device and said first control surface during operation of the fluid control device, wherein said first control surface fluidly connects and disconnects said first fluid conduit to and from said fluid transfer chamber and said second control surface fluidly connects and disconnects said third fluid conduit to and from said fluid transfer chamber, and wherein said second fluid conduit is always fluidly connected to said fluid transfer chamber.

20. A fluid control device comprising:
   a fluid transfer chamber;
   a first fluid conduit, a second fluid conduit, and a third fluid conduit that are fluidly connected to the fluid transfer chamber;
   a control spool that is arranged movably inside the fluid transfer chamber in a way that the first fluid conduit and the third fluid conduit can be selectively fluidly connected to the second fluid conduit through the fluid transfer chamber;
   wherein a first control surface of the control spool is arranged in a vicinity of the first fluid conduit such that the first control surface is closer to the first fluid conduit as opposed to the second fluid conduit and the third fluid conduit;
   wherein a second control surface of the control spool is arranged in a vicinity of the third fluid conduit such that the second control surface is closer to the third fluid conduit as opposed to the first fluid conduit and the second fluid conduit;
   wherein the control spool comprises an intermediary position where no fluid flow is established between the first, second and third fluid conduit through the fluid transfer chamber;
   wherein a fluid flux reducing means is arranged downstream of the first control surface and inside the fluid transfer chamber;
   wherein the fluid flux reducing means is configured to increase pressure in an intermediary volume between the fluid flux reducing means and the first control surface or the second control surface during operation of the fluid control device;
   wherein the first control surface fluidly connects and disconnects the first fluid conduit to and from the fluid transfer chamber;
   wherein the second control surface fluidly connects and disconnects the third fluid conduit to and from the fluid transfer chamber; and
   wherein said second fluid conduit is always fluidly connected to said fluid transfer chamber.

* * * * *